Figure 5:
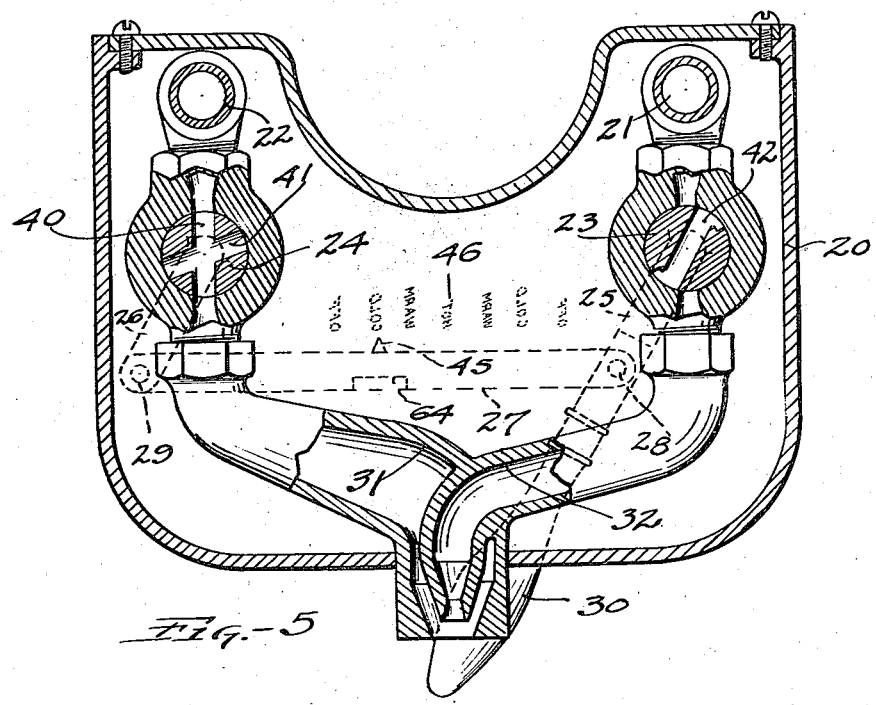
Figure 6:
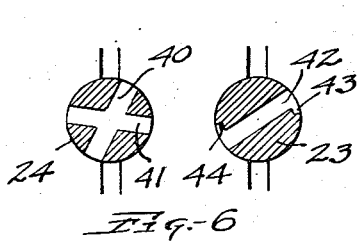
Figure 7:
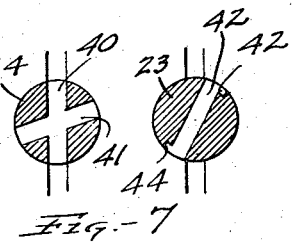
Figure 8:
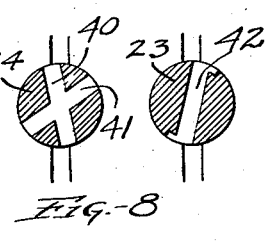
Figure 9:
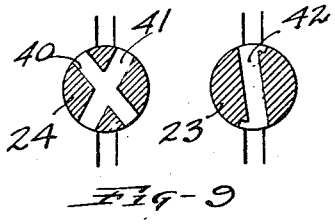
Figure 10:
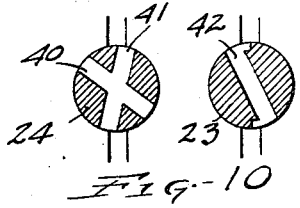
Figure 11:
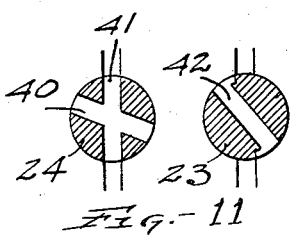
Figure 12:
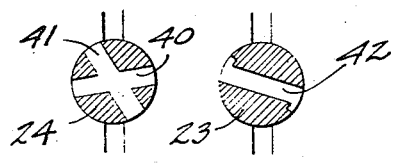

June 24, 1924.
W. L. DEMING
FAUCET
Original Filed Aug. 25, 1919    2 Sheets-Sheet 1
1,498,788
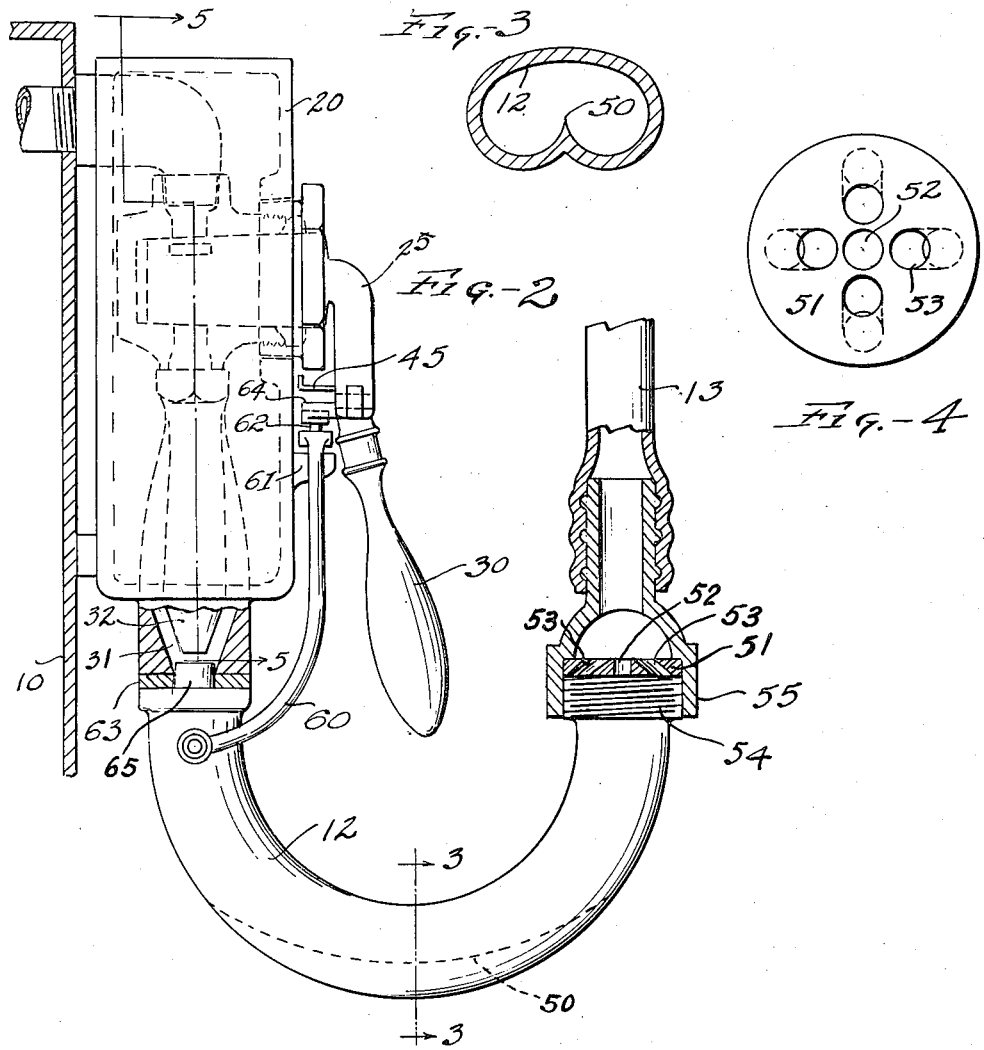
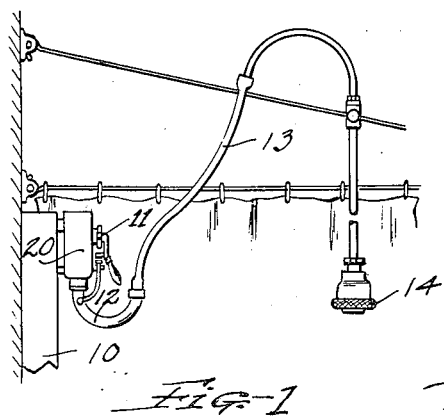
INVENTOR
Wm. L. Deming,
By Baker & Moeklin,
ATTORNEYS June 24, 1924.

W. L. DEMING

FAUCET 1,498,788

Original Filed Aug. 25, 1919   2 Sheets-Sheet 2

INVENTOR
Wm. L. Deming.
By Baker & Macklin,
ATTORNEYS

Patented June 24, 1924.

1,498,788

UNITED STATES PATENT OFFICE.

WILLIAM L. DEMING, OF SALEM, OHIO.

FAUCET.

Original application filed August 25, 1919, Serial No. 319,718. Divided and this application filed July 5, 1921. Serial No. 482,350.

*To all whom it may concern:*

Be it known that I, WILLIAM L. DEMING, a citizen of the United States of America, residing at Salem, in the county of Columbiana and State of Ohio, have invented a certain new and useful Improvement in Faucets, of which the following is a full, clear, and exact description, reference being had to the accompanying drawings.

This invention relates to faucets and is particularly concerned with the provision of a combined faucet and mixer which is well adapted for use in connection with existing types of shower bath apparatus.

Various mixers and valve control mechanisms have been employed in bathing apparatus for controlling the temperature of the water, and for causing an intermixture between the hot and cold currents intermediate the inlet valve and the discharge point. In most of these cases, however, there is no provision for controlling the flow of water so far as quantity is concerned, other than by operation of the valves which are connected with the control handle. In such cases, if the cold water is turned on at another point in the line, the supply of cold water at the shower is thereby decreased whereupon the bather is exposed to a sudden flow of hot water. Again, in numerous instances the control valves are so arranged that the hot water may be suddenly turned on by the operator himself as the handle is being moved from the "off" to the "active" position.

One of the objects of my invention, therefore, is the provision of a combined faucet and mixer which will insure a thorough mixing between the hot and cold fluids, and at the same time prevent a sudden excess of hot water as the cold water is tapped at another point in the line. Another object is the provision of a control mechanism for regulating the temperature of the bathing fluid by manipulating a single handle, together with the provision of means for preventing the operator from turning on the hot water unexpectedly.

In carrying out my invention, I employ a pair of hot and cold water cocks each having a rotatable plug, and I provide a connecting link which extends between the plugs in such manner that movement of one causes simultaneous movement of the other, and I provide channels within the plugs, which channels are so positioned in relation to each other that the fluid is caused to flow at varying degrees from cold to hot, as the control handle is moved from either extreme to the middle position. After the water passes through the respective valves, it flows through my mixing device, which thoroughly mixes the hot and cold water, and at the same time prevents an excessive flow of hot water should the cold water be tapped at another point in the line.

The means for accomplishing the above objects will be more fully set forth in the following description which relates to the drawings, and the essential characteristics of my invention will be set forth in the claims.

In the drawings, Fig. 1 is an elevation of a shower device having control mechanism embodying features of my invention; Fig. 2 is an enlarged elevation partly in section, showing the valve control mechanism and the manner of annexing the mixer thereto; Fig. 3 is a section taken through the mixer on the line 3—3 of Fig. 2; Fig. 4 is a plan through one of the baffles in the mixing chamber; Fig. 5 is a vertical section through the valve control mechanism taken on the line 5—5 in Fig. 2; Figs. 6 to 12 are diagrammatic sectional views representing successive positions of the hot and cold water cocks.

My valve mechanism is adapted for use either with or without the mixing device shown. The valve control mechanism functions to mix the hot and cold water when a basin or receptacle is positioned directly beneath the faucet, while the mixing device functions to thoroughly intermix the fluids when a shower nozzle is employed as in Fig. 1. I have shown my device in connection with a shower bath wherein 10 represents a housing having hot and cold water pipes therein, which lead to a faucet indicated generally at 11, and thence through a mixing device 12, a flexible tube 13 and a discharge nozzle 14. A bathing apparatus embodying features shown in Fig. 1 is illustrated and described in my co-pending application, Serial No. 319,718, filed August 25, 1919, and reference may be had thereto for claims covering the subject matter of the bathing apparatus in general. This application is a division of the above co-pending application.

The faucet control mechanism as indicated in Fig. 2 is preferably contained within a housing 20, and comprises hot and cold water conduits as at 21 and 22, there being a revolving plug cock 23 and 24 in each respectively. The respective plugs are preferably constructed with laterally bent stems designated 25 and 26, which stems are connected by a link 27 and pivoted to each end thereof as at 28 and 29, and operable by a common handle 30 constituting an extension of one of the stems, for example 25.

From one of these cocks, preferably the cold water cock 24, I provide, as shown in Fig. 5 a downwardly curving discharge passageway 31, and into this passageway I provide a discharge conduit 32 leading from the other cock. The two conduits 31 and 32, where they are concentric, effect an ejector action whereby a discharge from the conduit 32 tends to draw liquid through the conduit 31. The result is that if the pressure is reduced only in the cold water conduit 31, other conditions remaining constant, then the flow through the hot water conduit tends to accelerate the discharge through the reduced pressure passageway, and thus to preserve a uniform temperature of the mixture. This is of particular value in preventing the discharged water from becoming suddenly too hot, which might ordinarily result from the cold water conduit being tapped at some other point before reaching the faucet. In such instances, the ejector action of the hot water tends to retain the proper supply of cold water.

The hot and cold water cocks are so arranged that when the handle 30 is in either extreme position, both cocks will be in closed or "off" position. Movement of the handle toward the mid position, which may be in either direction depending upon which closed position it is in, will successively open the cold water cock only, then both hot and cold, producing warm water and finally the hot only. The handle may be continued in movement in the same direction to the other extreme position, during which operation the reverse sequence will occur, giving in succession, warm water and cold water, before reaching the closed or "off" position. The successive positions of the ground keys or plugs constituting the seven stages from one extreme position of the handle to the other are namely: closed, cold, warm, hot, warm, cold, closed.

As will be apparent from Figs. 6 to 12, the cold water cock is provided with two-way channels 40 and 41, while the hot water cock has a single channel 42 with enlarged offset ends 43 and 44, whereby the desired flow of water may be obtained by movement of the handle in either direction. An indicator may be employed with the faucet in any desired manner and accordingly, I have shown a pointer 45 on the link 27, which pointer is movable over the scale 46 and is graduated in accordance with the various positions of the hot and cold water cocks. This scale may be positioned on the front of the casing 20.

The device described and as illustrated in Fig. 5 may be employed where a basin or receptacle is positioned directly beneath the faucet for receiving the discharged fluid. To effectively mix the hot and cold water, however, when a shower nozzle is attached to the discharge passageway 31, I provide a device, shown generally at 12 in Fig. 1 and in detail in Figs. 2, 3 and 4, which device is positioned between the faucet and the flexible tube 13. As shown, this device comprises a U-shaped pipe removably connected at one end of the discharge end of the faucet casing 20 and at the other end to the tube 13. The lower portion of the U-shaped conduit is extended upwardly into an internal ridge or peak 50 which divides the conduit into two passageways extending longitudinally therethrough. At the discharge end of the U-shaped conduit, I provide a baffle in the form of a disk-like plate 51 having orifices therethrough, preferably a central straight orifice 52, and a plurality of inclined orifices 53 near the edge thereof. Adjacent this disk, the conduit 12 may be provided with a screw threaded portion 54 onto which extends a flanged coupling 55 connected with the flexible conduit 13.

The result of the above described construction is, that the water discharged from the faucet first strikes the ridge 50 which tends to split the stream and give it a lateral motion which partially mixes it. Then, as the stream reaches the baffle 51, part of it passes directly through the central orifice 52 and part is directed by the oblique orifices 53 toward the orifice 52, whereby a thorough mixture of the hot and cold water is effected before it enters the tube 13.

Any suitable means may be employed for detachably connecting the U-shaped conduit 12 with the casing 20, but I have shown for this purpose, a bail 60 hinged to the U-shaped pipe and adapted to extend over a lug 61 on the faucet casing. A suitable thumb screw 62, passing through the bail, is adapted to bear against the lug for holding the device in position, leakage being prevented by a gasket 63 between the U-shaped pipe and the lower portion of the discharge conduit 31. A centering lug or pipe 65 may be employed for retaining the conduit 12 in adjusted relation with the discharge conduit 31. Centrally located on the link 27 and adjacent the casing, I provide a lug 64 which is arranged to be employed for limiting the movement of the link whenever the shower conduit is in use. Such limitation is effected by reason of the fact that the lug is brought in line with the set screw 62, and is engaged thereby, for preventing the entire central position of the handle so as to cause a discharge of hot water, without permitting some cold water to flow through the conduit 31. When using the shower, this safety device is operated regardless of the "off" position in which the handle 30 may have been left prior to the attachment of the shower conduit. When the bail 60, having the thumb screw 62 is removed, the mixer is no longer required, and since there is then no cooperation between the set screw 62 and lug 64, the handle 30 may be moved through all of the stages, from one extreme to the other. Accordingly, the handle may be so moved that hot water only, if desired, may be permitted to flow into the basin, or receptacle, positioned directly beneath the discharge conduit 31. By loosening the set screw the bail may be readily swung aside and the U-shaped pipe disconnected, whereupon the bail furnishes convenient means for hanging the disconnected pipe and tubing on a suitable support. This disconnection is effected without necessitating any disturbance of the connection between the U-shaped member and the flexible conduit.

From the foregoing description it will be seen that I have provided a combined faucet and mixer, which is well adapted for use in connection with a bathing apparatus, either with or without a shower attachment, and that I have provided a mixer which, when used with hot and cold water, is so arranged that a current having one temperature will induce the flow of current having another temperature. Accordingly, it will be seen that a device embodying my invention prevents a sudden flow of hot water if the cold water is tapped at another point in the line. A further feature, as will be noticed, from the description, is that the temperature may be varied from cold to hot by moving the control handle from either extreme to the middle point in its course of travel, and that a satisfactory safety device is provided when the tube 12 is used for preventing the sudden flow of hot water, by inadvertently moving the handle to the mid point of its course of travel.

Having thus described my invention, I claim:

1. In a bathing apparatus, the combination with a combined hot and cold water faucet of means tending to preserve the set proportion of hot and cold water notwithstanding variations of pressure in one of the water pipes.

2. The combination with a hot and cold water faucet of conduits, one extending inside of the other and discharging along the bore thereof for producing an ejector action tending to preserve the set proportion of hot and cold water.

3. In a device of the character described, the combination with a casing, of hot and cold water conduits therein, a separate control plug for each conduit, said conduits entering into the casing at separate points and discharging at a single point, both of said conduits being substantially concentric at the point of discharge.

4. In a device of the character described, the combination with a casing, of hot and cold water conduits therein, one of said conduits extending within the other adjacent to the discharge point, and both of said conduits being tapered at said point of discharge whereby one of said conduits tends to induce the flow in the other of said conduits and thus to preserve a constant flow of fluid.

5. The combination with a casing, of hot and cold water conduits therein and a common discharge conduit, said discharge conduit being formed by the hot water conduit extending within the cold water conduit, so that the axis of both conduits are concurrent at the point of discharge.

6. In an apparatus of the class described, the combination with a combined hot and cold water faucet having a common discharge, of a mixing device connected with said discharge, and comprising a U-shaped tube having an internal ridge integral therewith and extending along its intermediate portion.

7. In an apparatus of the class described, the combination with a combined hot and cold water faucet having a common discharge, of a mixing device connected with said discharge and comprising a U-shaped tube, said tube having oblique discharge passageways.

8. In a combined hot and cold water faucet, means including a handle connecting the hot and cold water cocks whereby they may be moved in unison from closed position, with the handle in either of two extreme positions, to mid position, with only the hot water cock open, and immediately through cold position on opposite side of the mid position.

9. In a combined hot and cold water faucet, means including a handle connecting the hot and cold water cocks whereby they may be moved in unison from closed position, with the handle in either of two extreme positions (through successive intermediate positions on each side of the mid-position in which the cold water cock only and both cold and hot water cocks are open respectively) to mid position with only the hot water cock open.

10. In a combined hot and cold water faucet, means connecting the hot and cold water cocks comprising a link connecting the stems of the hot and cold water cocks, and a common handle whereby they may be moved in unison from closed position, with the handle in either of two extreme positions, to mid position with only the hot water cock open, through cold position on each side of the mid-position.

11. In a combined hot and cold water faucet, means connecting the hot and cold water cocks comprising a link connecting the stems of the hot and cold water cocks, and a common handle whereby they may be moved in unison from closed position, with the handle in either of two extreme positions (through successive intermediate positions, in which the cold water cock only, and both cold and hot water cocks, are open respectively) to mid position, with only the hot water cock open.

12. In a combined hot and cold water faucet, hot and cold water cocks connected for movement in unison, whereby movement from one extreme closed position to the other, will give successively cold, hot, and cold water.

13. In a combined hot and cold water faucet, hot and cold water cocks connected for movement in unison by a common handle, whereby movement of the handle from one extreme closed position to the other will give successively cold, warm, hot, warm and cold water.

14. In a combined hot and cold water faucet, hot and cold water cocks having one- and two-way channels respectively connected for movement in unison, whereby movement from one extreme closed position to the other will give successively cold, warm, hot, warm and cold water.

15. In a combined hot and cold water faucet, hot and cold water cocks having one- and two-way channels respectively, connected for movement in unison by a link and common handle, whereby movement of the handle from one extreme closed position to the other will give successively cold, warm, hot, warm and cold water.

16. The combination of a faucet having hot and cold water cocks connected for movement in unison, a discharge conduit therefor, means including a bail for removably coupling the conduit to the faucet, and means for preventing the movement of the cocks into position to permit hot water only to flow.

17. The combination of a faucet having hot and cold water cocks connected for movement in unison, a common discharge conduit, means adapted to removably couple the conduit to the faucet, and means associated therewith to prevent opening of the hot water cock only.

18. The combination of a faucet, having hot and cold water cocks connected for movement in unison, a common discharge conduit therefor, means comprising a lug on the faucet and a bail on the conduit adapted to removably couple the conduit to the faucet.

19. The combination of a faucet having hot and cold water cocks connected for movement in unison, a common discharge conduit therefor, means comprising a lug on the faucet and a bail on the conduit adapted to removably couple the conduit to the faucet, and means associated therewith to prevent opening of the hot water cock only.

20. The combination of a faucet having hot and cold water cocks connected for movement in unison, a discharge conduit having a pipe connection therefor, means comprising a lug on the conduit adapted to receive a bail attached to the pipe connection, and means associated with the bail to prevent opening of the hot water cock only.

21. The combination of a faucet having hot and cold water cocks connected for movement in unison by a link connected to the respective stems, a discharge conduit therefor, means comprising a lug on the faucet and a bail on the conduit adapted to removably couple the conduit to the faucet, and means on said link associated with said bail to prevent opening of the hot water cock only.

22. The combination of a faucet having hot and cold water cocks connected for movement in unison by a link connected to the respective stems, a discharge conduit therefor, means comprising a lug on the faucet and a bail on the conduit adapted to removably couple the conduit to the faucet, a thumb screw on the bail and means on said link engaging said thumb screw to prevent opening of the hot water cock only.

23. The combination of a combined hot and cold water faucet, of a U-shaped tube connected therewith, a disc carried by the tube and having a direct central orifice and a plurality of orifices near its edge inclined toward the central orifice.

24. The combination of a combined hot and cold water faucet, of a mixing device, a bail adapted to removably couple the mixing device to the faucet, and a discharge conduit connected with the mixing device.

25. The combination of a combined hot and cold water faucet having a common discharge, a mixing device, and a bail connected to the mixing device and having a set screw adapted to engage a lug on the faucet.

In testimony whereof, I hereunto affix my signature.

WILLIAM L. DEMING.